(12) United States Patent
Oommen et al.

(10) Patent No.: US 10,860,114 B1
(45) Date of Patent: Dec. 8, 2020

(54) GESTURE CONTROL AND PULSE MEASUREMENT THROUGH EMBEDDED FILMS

(71) Applicant: BOSE CORPORATION, Framingham, MA (US)

(72) Inventors: Binu Oommen, Franklin, MA (US); Mikhail Ioffe, Newton, MA (US); Thomas Claude Bernard Landemaine, Cambridge, MA (US); Prateek Nath, Southborough, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/447,602

(22) Filed: Jun. 20, 2019

(51) Int. Cl.
   *G06F 3/01* (2006.01)
   *H04R 1/10* (2006.01)

(52) U.S. Cl.
   CPC .............. *G06F 3/017* (2013.01); *G06F 3/012* (2013.01); *H04R 1/1041* (2013.01)

(58) Field of Classification Search
   CPC ........ G06F 3/017; G06F 3/012; H04R 1/1041
   See application file for complete search history.

(56) References Cited

U.S. PATENT DOCUMENTS

| | | | |
|---|---|---|---|
| 8,157,730 B2 | 4/2012 | LeBoeuf et al. | |
| 8,251,903 B2 | 8/2012 | LeBoeuf et al. | |
| 8,320,982 B2 | 11/2012 | LeBoeuf et al. | |
| 8,323,982 B2 | 12/2012 | LeBoeuf et al. | |
| 8,647,270 B2 | 2/2014 | LeBoeuf et al. | |
| 8,888,701 B2 | 11/2014 | LeBoeuf et al. | |
| 9,538,921 B2 | 1/2017 | LeBoeuf et al. | |
| 9,788,794 B2 | 10/2017 | LeBoeuf et al. | |
| 9,794,653 B2 | 10/2017 | Aumer et al. | |
| 9,801,552 B2 | 10/2017 | Romesburg | |
| 9,993,204 B2 | 6/2018 | Romesburg | |
| 10,076,253 B2 | 9/2018 | Just et al. | |
| 10,349,844 B2 | 7/2019 | Romesburg | |
| 10,390,762 B2 | 8/2019 | Romesburg | |
| 2017/0080255 A1* | 3/2017 | Law .......................... A61N 7/00 | |
| 2017/0112447 A1 | 4/2017 | Aumer et al. | |
| 2017/0119314 A1 | 5/2017 | Just et al. | |
| 2017/0215768 A1* | 8/2017 | Belfiori ................... G06F 1/163 | |
| 2017/0290549 A1 | 10/2017 | Romesburg | |
| 2018/0008200 A1 | 1/2018 | Romesburg | |
| 2018/0020979 A1 | 1/2018 | Wagner et al. | |
| 2018/0199837 A1 | 7/2018 | Aumer et al. | |
| 2018/0220901 A1 | 8/2018 | LeBoeuf et al. | |
| 2018/0353134 A1 | 12/2018 | Walter et al. | |
| 2019/0343452 A1* | 11/2019 | Ellspermann ........ A61B 5/4557 | |

FOREIGN PATENT DOCUMENTS

| KR | 101225554 B1 | 2/2013 |
|---|---|---|
| WO | 2018175196 A1 | 9/2018 |
| WO | 2019133491 A1 | 7/2019 |

\* cited by examiner

*Primary Examiner* — Regina N Holder
(74) *Attorney, Agent, or Firm* — Lando & Anastasi, LLP

(57) ABSTRACT

A system comprises a wearable item comprising a film of an electrically active material configured to exhibit one or more electrical properties that vary responsive to a movement or gesture performed by a user wearing the wearable item and a controller configured to read the one or more electrical properties of the electrically active material and to activate a control function of an electronic device responsive to detecting a predetermined pattern exhibited by the one or more electrical properties of the electrically active material.

21 Claims, 19 Drawing Sheets

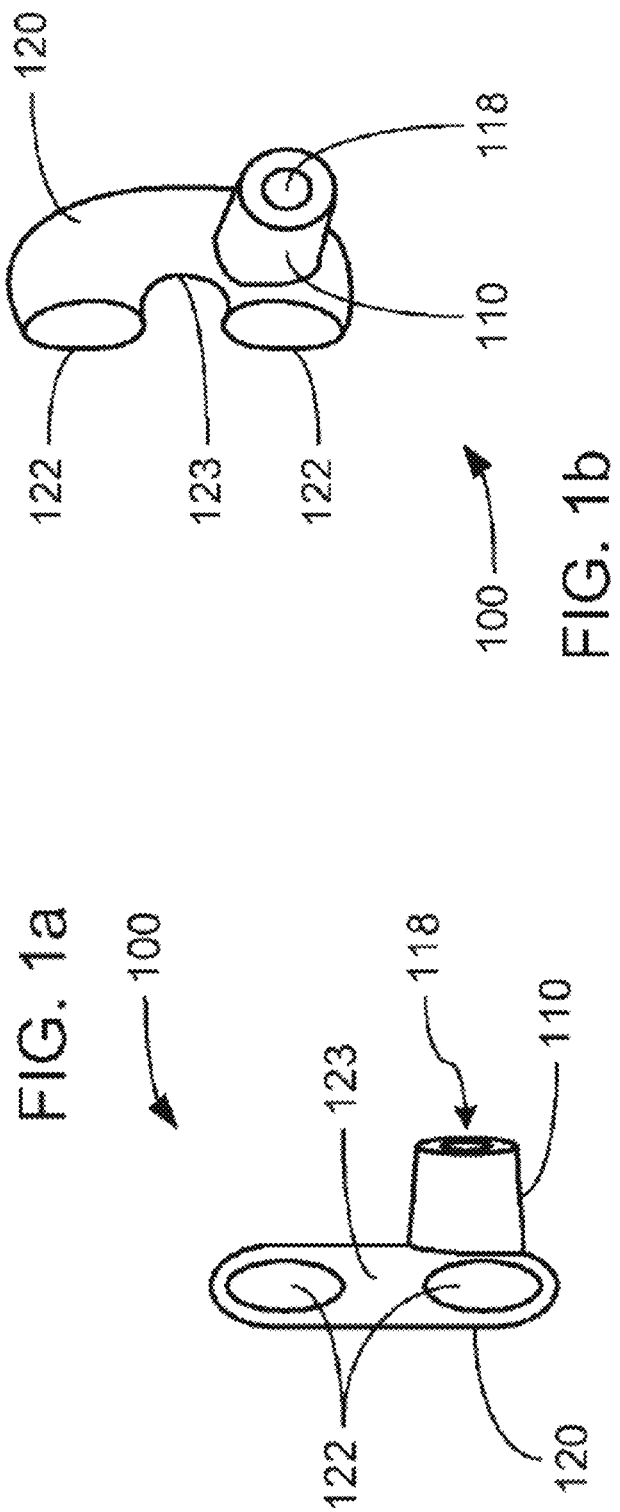

GESTURE CONTROL AND PULSE MEASUREMENT THROUGH EMBEDDED FILMS

TECHNICAL FIELD

Aspects and implementations of the present disclosure are directed generally to systems and methods for control of electronic devices through gestures detected via electroactive films included in wearable devices, for example, wearable audio devices such as headphones or glasses, and to monitoring of physiological parameters of a user utilizing same.

BACKGROUND

The use of audio devices to enable audio to be acoustically output to one or both ears of a user has become commonplace, especially with the widespread use of digital audio recording playback devices and two-way wireless communications devices (e.g., cell phones and personal data assistant devices incorporating cell phone capabilities).

Some digital audio recording playback devices or two-way wireless communications devices, collectively referred to herein as "personal electronic devices", may have controls, for example, volume, play/pause, start/stop, wake/sleep, etc. that may be located on a wire coupling the personal electronic device to an audio device or on the audio device itself. Other personal electronic devices may be capable of voice control for various functions via a microphone that may located on or in the personal electronic device, on a wire coupling the personal electronic device to an audio device, or on the audio device itself to enable hands-free control of at least some functions of the personal electronic device.

SUMMARY

In accordance with an aspect of the present disclosure, there is provided a system. The system comprises a wearable item comprising a film of an electrically active material configured to exhibit one or more electrical properties that vary responsive to a movement or gesture performed by a user wearing the wearable item and a controller configured to read the one or more electrical properties of the electrically active material and to activate a control function of an electronic device responsive to detecting a predetermined pattern exhibited by the one or more electrical properties of the electrically active material.

In some examples, the wearable item is at least one of: an earbud, a headphone, an open-ear audio device, or audio eyeglasses.

In some examples, the film of electrically active material is disposed in an eartip of the earbud.

In some examples, deformation or pressure applied to the eartip responsive to a facial movement of the user causes the one or more electrical properties of the electrically active material to change.

In some examples, the controller is configured to discriminate between patterns of change in the one or more electrical properties of the electrically active material associated with different facial movements of the user. The controller may be configured to associate different control functions of the electronic device with the different facial movements of the user and to active the different control functions responsive to detection of the different respective facial movements of the user.

In some examples, the electrically active material is a piezoelectric material. The electrically active material may be a piezoelectric polymer.

In some examples, the electrically active material is a material having an electrical resistance that changes responsive to deformation of the material. The electrically active material may include carbon particles in a silicone matrix.

In some examples, the controller is further configured to perform a training routine in which the movement or gesture performed by the user is mapped to the control function of the electronic device.

In some examples, the electronic device is a pulse monitor and activating the control function of the electronic device includes recording a pulse of the user determined from the pattern exhibited by the one or more electrical properties of the electrically active material.

In accordance with another aspect, there is provided a method of controlling one or more functions of an electronic device. The method comprises applying a wearable item to the body of a user, the wearable item comprising a film of an electrically active material configured to exhibit one or more electrical properties that vary responsive to a movement or gesture performed by the user, monitoring the one or more electrical properties of the electrically active material, detecting a change in the one or more electrical properties of the electrically active material, and activating a control function of an electronic device responsive to detecting a predetermined pattern in the change in the one or more electrical properties of the electrically active material.

In some examples, applying the wearable item to the body of the user includes inserting an earbud into an ear of the user.

In some examples, the method further comprises activating one control function of the electronic device responsive to detecting a change in the one or more electrical properties of the electrically active material associated with a first type of movement of the user and activating a second control function of the electronic device responsive to detecting a change in the one or more electrical properties of the electrically active material associated with a second type of movement of the user. One of the first type of movement or the second type of movement may be a facial movement.

In some examples, activating the control function of the electronic device includes recording a pulse of the user determined from the pattern in the change in the one or more electrical properties of the electrically active material.

In some examples, the wearable item includes a pair of eyeglasses.

In some examples, the electrically active material comprises a force sensing resistor.

In some examples, the movement is a facial movement.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1a is a perspective view of an example of in-ear audio device;

FIG. 1b is another perspective view of the example of the in-ear audio device of FIG. 1a;

DETAILED DESCRIPTION

Figure 2A:
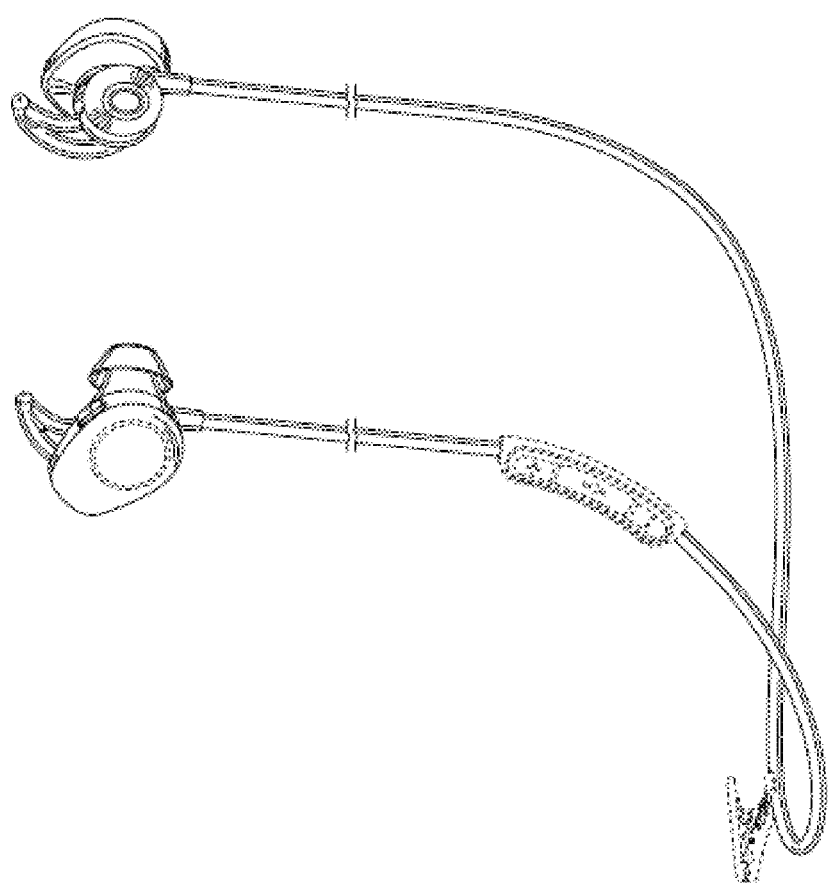
FIG. 2a is an isometric view of an in-ear audio device headset.

Aspects and implementations disclosed herein are not limited to the details of construction and the arrangement of components set forth in the following description or illustrated in the drawings. Aspects and implementations disclosed herein are capable of being practiced or of being carried out in various ways.

Aspects and implementations disclosed herein may be applicable to a wide variety of wearable audio devices, for example, in-ear audio devices, i.e., devices that are structured to be used in a manner in which at least a portion of the device is positioned within the concha and/or ear canal portions of an ear of a user (e.g., so-called "in-ear" audio devices or "intra-aural" audio devices), hereinafter referred to as "wireless earbuds" or simply "earbuds". The term "wearable audio device", as used in this application, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver may be housed in an earcup or earpiece. While some of the figures and descriptions following may show a single wearable audio device, having a pair of earcups or earpieces (each including an acoustic driver), it should be appreciated that a wearable audio device may be a single stand-alone unit having only one earcup. Each earcup of the wearable audio device may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIGS. 1-2 show an example of an in-ear headset, in other examples the headset may be an around-ear, on-ear, or near-ear headset. In some examples, a wearable audio device may be an open-ear device that includes an acoustic driver to radiate acoustic energy towards the ear canal while leaving the ear open to its environment and surroundings (e.g., audio eyeglasses or other open-ear audio devices). It should be noted that although specific implementations of wearable audio devices primarily serving the purpose of acoustically outputting audio are presented with some degree of detail, such presentations of specific implementations are intended to facilitate understanding through provision of examples and should not be taken as limiting either the scope of disclosure or the scope of claim coverage.

Aspects and implementations disclosed herein may be applicable to wearable audio devices that either do or do not support two-way communications, and either do or do not support active noise reduction (ANR). For wearable audio devices that do support either two-way communications or ANR, it is intended that what is disclosed and claimed herein is applicable to a wearable audio device incorporating one or more microphones disposed on a portion of the wearable audio device that remains outside an ear when in use (e.g., feedforward microphones), on a portion that is inserted into a portion of an ear when in use (e.g., feedback microphones), or disposed on both of such portions. Still other implementations of wearable audio devices to which what is disclosed and what is claimed herein is applicable will be apparent to those skilled in the art.

Various implementations and examples disclosed herein may provide for control of functions of a personal electronic device that may be complimentary to or that may be used as alternatives to systems and methods of control utilizing voice actuation or manual manipulation of controls on a wire or body of a wearable audio device. As wearable audio device technology continues to advance, wearable audio devices are shrinking in size as compared to wearable audio devices manufactured in the past. There is a space constraint on many current wearable audio device designs for manually actuatable buttons for control of the wearable audio device or a personal electronic device in communication with the wearable audio device.

It has been recognized that hands-free control of functions of a personal electronic device provides advantages in that a user may control the personal electronic device while the hands of the user are otherwise occupied, for example, while driving, typing, or carrying an item. Voice actuation systems provide for one means of hands-free control of some personal electronic devices, however, it has been recognized that voice actuation systems and methods may be unreliable or even unusable in environments having a high degree of external noise. Further, voice control of personal electronic devices may not be considered appropriate in environments where silence is expected, for example, in a library or church.

Various implementations and examples disclosed herein may provide for control of functions of a personal electronic device by performing gestures, for example, various movements of parts of the face (for example, the mouth, eyes, ears, eyebrows, etc.) that may be detected by a wearable audio device and translated into commands for control of the personal electronic device.

FIGS. 1a and 1b, taken together, provide two views of one implementation of a wearable audio device 100. The examples illustrated in FIGS. 1a and 1b are schematic representations of one possible wearable audio device configuration, but the ideas described herein apply to other configurations of wearable audio devices, for example, as shown in later figures. Wearable audio device 100 includes a casing made up of at least a canal portion 110 meant to be positioned within at least an entrance of an ear canal of a user's ear and a concha portion 120 meant to be positioned within at least a portion of the concha of the user's ear. More specifically, and as depicted, the concha portion 120 has a curved shape to fit within the concha of a user's ear while accommodating the shape of the concha as defined by portions of the tragus, anti-tragus, and anti-helix of the pinna of the ear. This C-shaped configuration has a pair of extensions 122 and defines an inner periphery 123. The canal portion 110 has a generally tubular shape extending from where one end of the canal portion 110 is coupled to the concha portion 120 at a location coincident with where the entrance to the ear canal is typically located in relation to the portion of the concha defined by portions of the tragus and anti-tragus. An aperture 118 is formed in the other end of the canal portion 110 to enable sounds to be acoustically output by an acoustic driver positioned within the casing of the wearable audio device 100 through the aperture 118 and into the ear canal when the wearable audio device 100 is properly positioned in the ear of a user during operation.

The implementation of the wearable audio devices 100 depicted in FIGS. 1a and 1b may be any of a variety of types of wearable audio devices able to perform any of a variety of audio functions including, and not limited to, an in-ear earphone to acoustically output audio, an in-ear ANR device to provide a reduction in environmental noise sounds encountered by a user through the acoustic output of anti-noise sounds, and/or a two-way communications audio device employing detection of the user's speech sounds through bone conduction and/or a Eustachian tube connected to portions of the ear into which the in-ear audio device 100 is inserted. Further, it should be noted that although the concha portion 120 has been depicted and described as having a curved shape to fit within the concha, other implementations are possible having a somewhat differently shaped concha portion 120 that does not fill as much of the concha, or that fills more of the concha.

The wearable audio device 100 may receive audio through a wired or wireless coupling with another device. Accordingly, electrical and electronic components such as, but not limited to, a wireless receiver and/or transmitter, processor (optionally including ANR circuitry), battery, microphone, and acoustic driver may be included within the concha portion 120 and/or canal portion 110 of the wearable audio device 100. Alternatively, such components may be included within a housing or casing coupled to the wearable audio device.

Figure 2B:
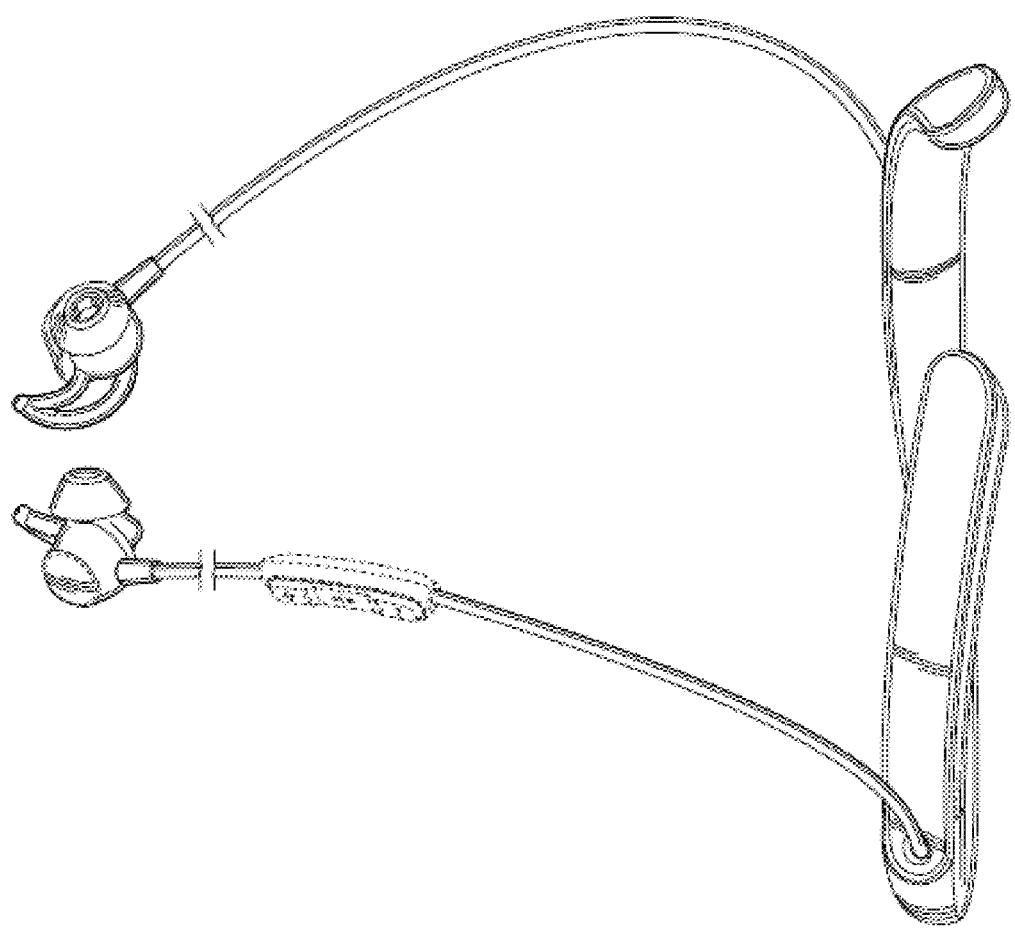
FIG. 2b is an isometric view of another in-ear audio device headset.
Figure 2C:
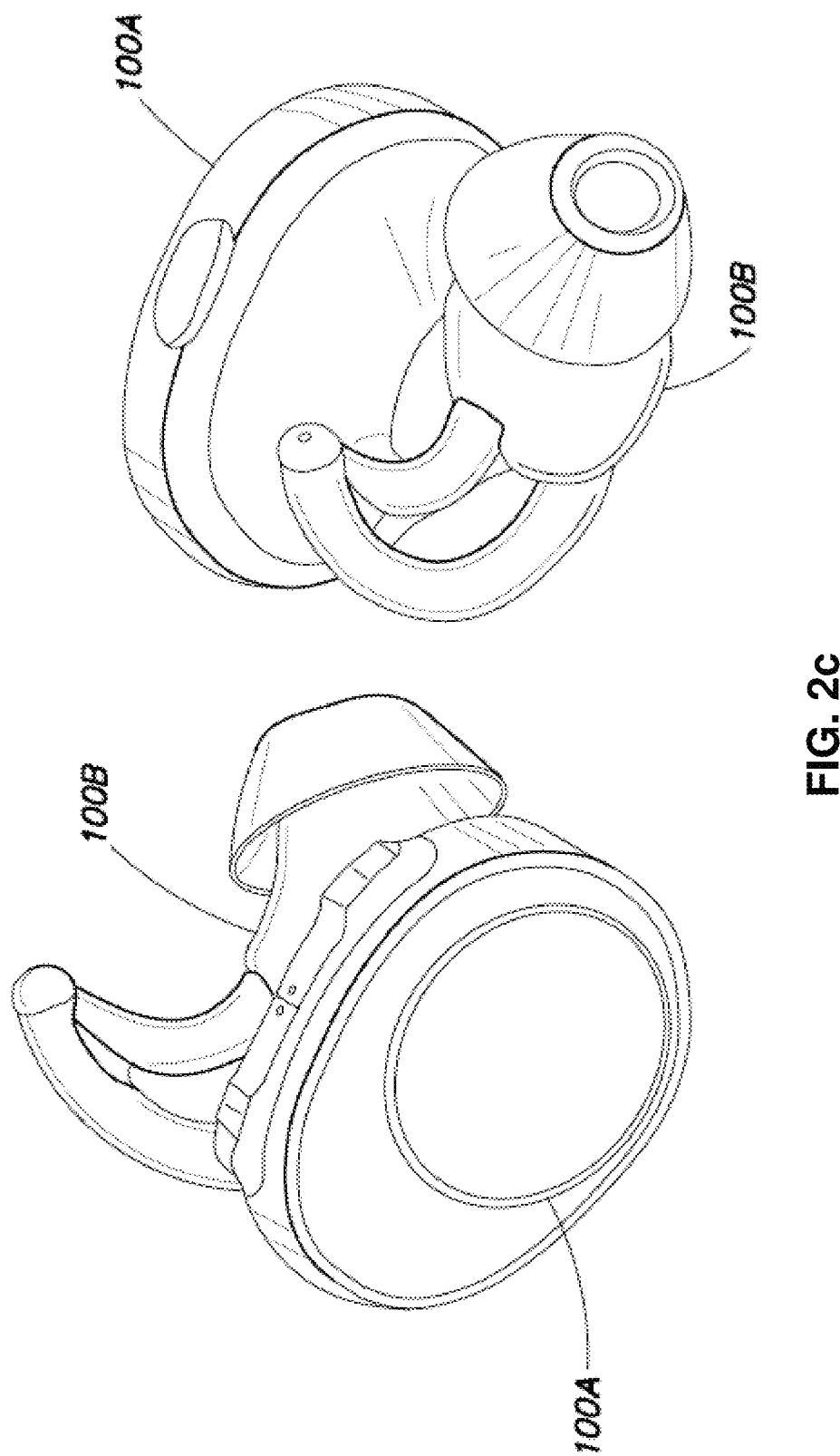
FIG. 2c illustrates an example of a pair of wireless in-ear audio devices.

Examples of wearable audio devices 100 disclosed herein are not limited to the form factors illustrated in FIGS. 1a and 1b. Other examples of form factors for wearable audio devices are illustrated in FIGS. 2a-2d. The wearable audio devices may be coupled by wiring as illustrated in FIGS. 2a and 2b to form headsets or may be mechanically separate, as illustrated in FIG. 2c. In various examples, the canal portion 110 or eartip may be separable from the concha portion 120 or may include a removable covering made of, for example, soft silicone to enhance comfort for a user. For example, in FIG. 2c, section 100A may include a rigid shell housing electronics such as an acoustic driver, wireless communication circuitry, battery, etc., while section 100B may be a removable eartip formed of a soft compliant material, for example, medical grade silicone.

Figure 2D:
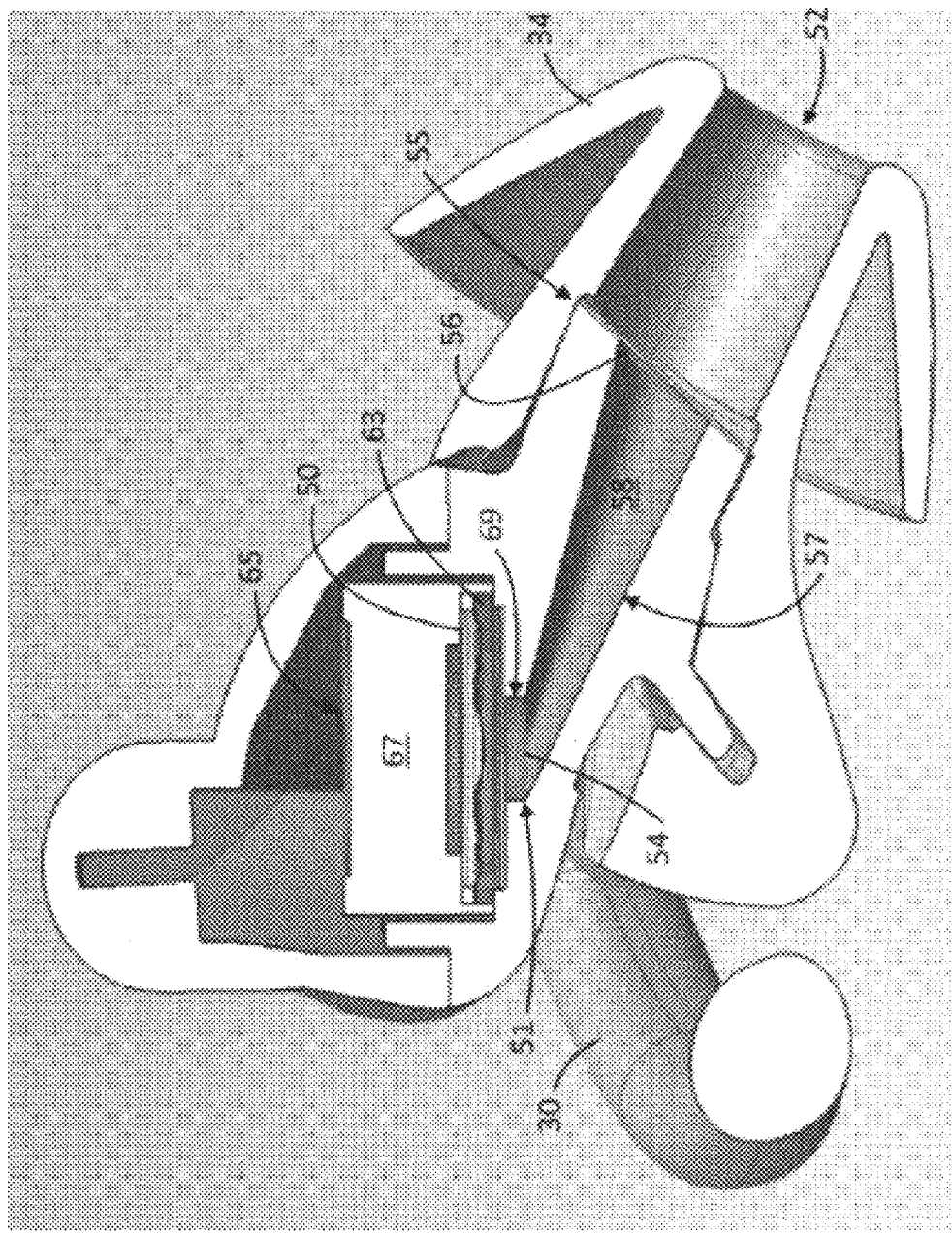
FIG. 2d is a perspective view in partial cross section of an example earpiece.

Examples of wearable audio devices 100 disclosed herein may have cross-sections similar to that illustrated in FIG. 2d. In the example illustrated in FIG. 2d an outer leg 30 may extend from the body of the wearable audio device, similar to concha portion 120 in FIGS. 1a and 1b to retain the wearable audio device in the ear of a user. A sealing structure 34 is provided to engage the entrance to the user's ear canal and defines an output aperture 52. The sealing structure 34 may be referred to herein as an eartip. The sealing structure/eartip 34 may be a mushroom or umbrella-shaped structure and may be formed of a soft, compliant material, for example silicone rubber. The sealing structure/eartip 34 may conform to the interior surface of the ear canal of the ear of a user when the wearable audio device is inserted into the ear of the user. In some implementations the sealing structure/eartip 34 forms an airtight, or substantially airtight seal against the interior surface of the ear canal of the ear of a user and may help acoustically isolate the ear canal of the user from external noise.

An entrance cavity 69 to an acoustic nozzle 57 having an interior volume 58 may be provided proximal to an acoustic driver 50. Driver 50 is enclosed in a driver cavity 65 including a front cavity 63 having a first volume and a back cavity 67 having a second volume. An entrance cavity 69 may be formed in front of driver cavity 63 that transitions to an entrance aperture 51 of the nozzle 57. In the implementation shown in FIG. 2d, the output aperture 55 of nozzle 57 is larger than the entrance aperture 51. A first acoustic mesh 54 is provided at the entrance aperture 51 of the acoustic nozzle proximate the acoustic driver 50, and a second acoustic mesh 56 is provided at the output aperture of the acoustic nozzle 57 distal from acoustic driver 50.

Figure 3A:
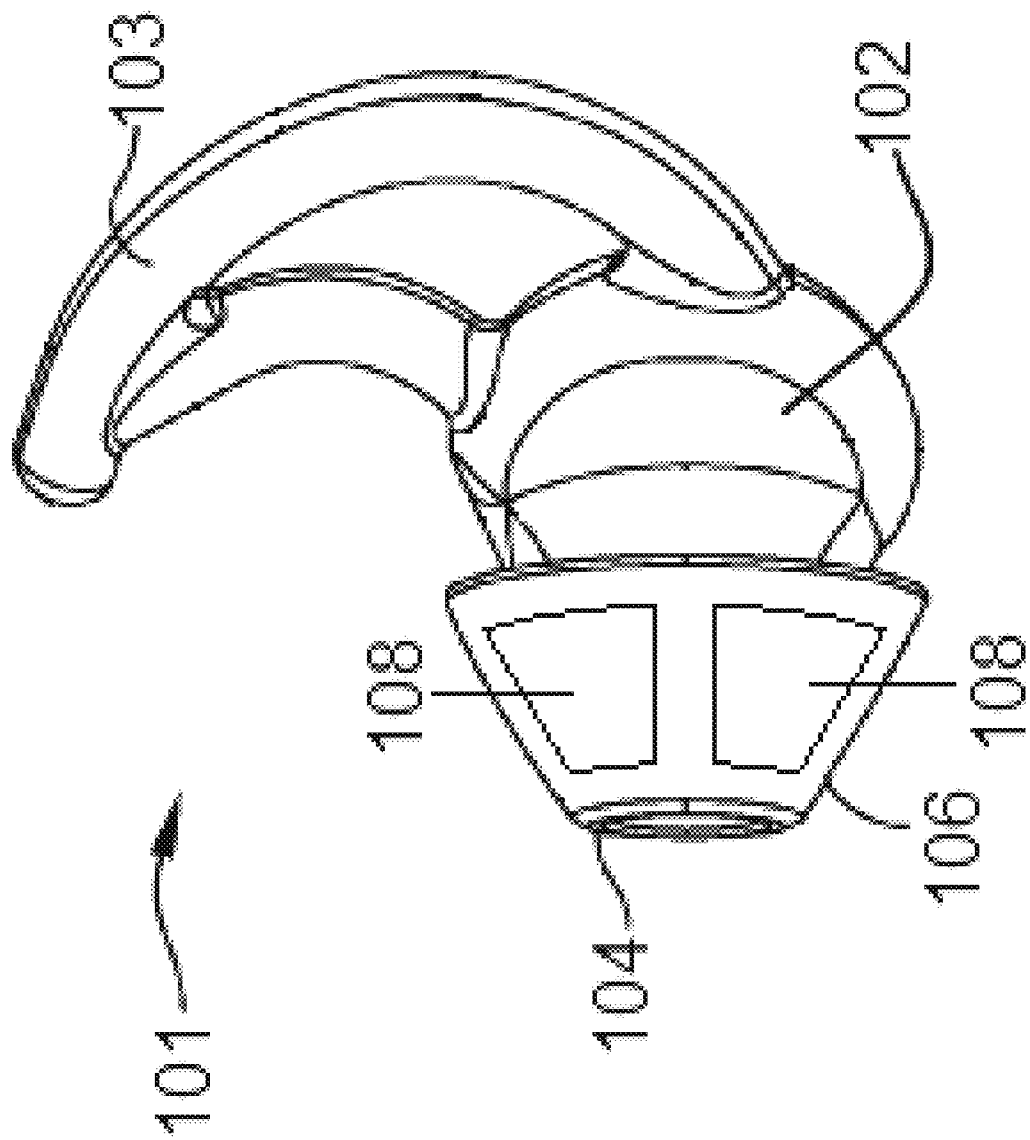
FIG. 3a is an example of a wearable audio device including electrically active film disposed in the eartip.
Figure 3B:
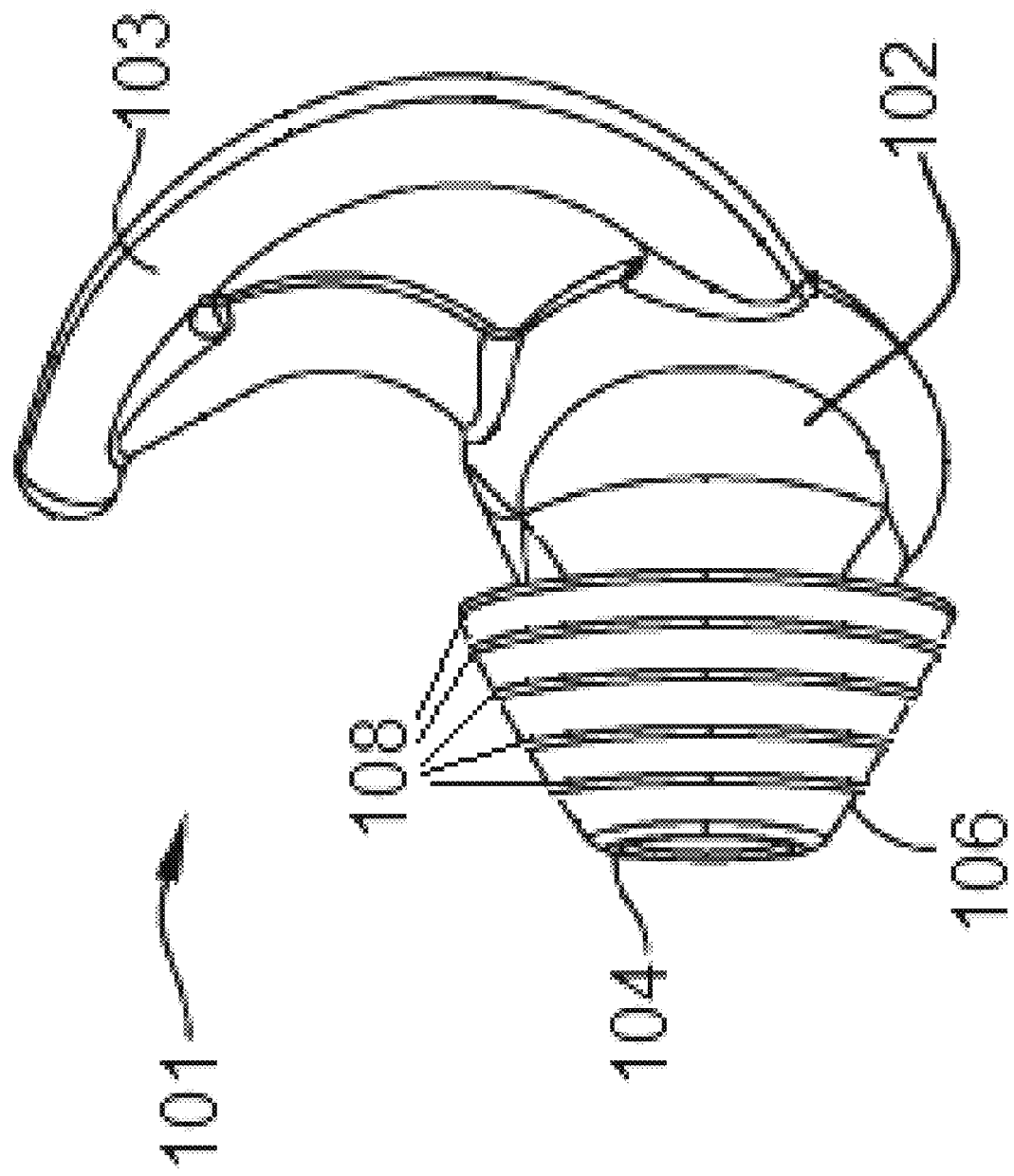
FIG. 3b is another example of a wearable audio device including electrically active film disposed in the eartip.
Figure 3C:
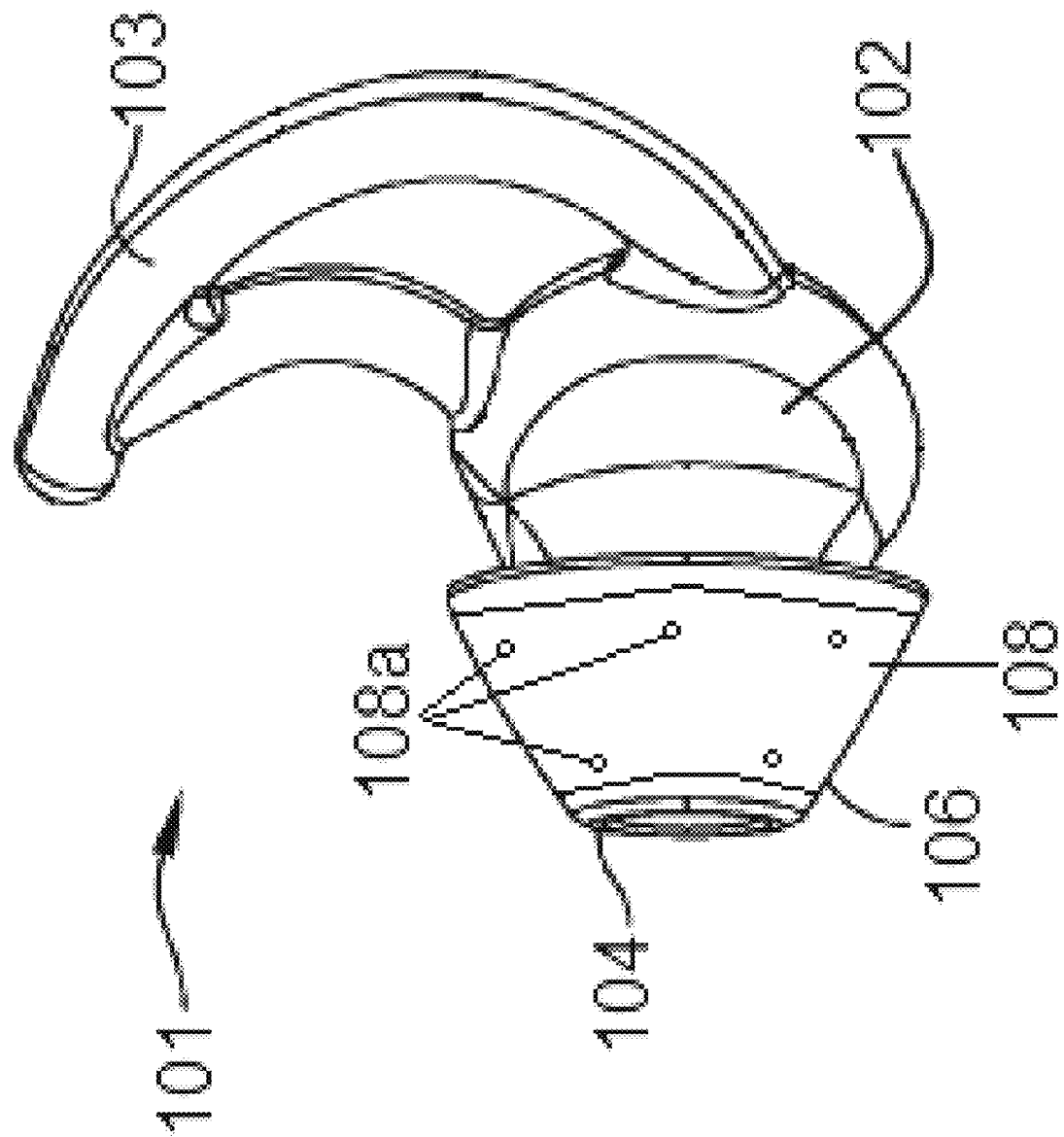
FIG. 3c is another example of a wearable audio device including electrically active film disposed in the eartip.

In some implementations, illustrated in FIGS. 3a, 3b, and 3c, a wearable audio device 100, or both wearable audio devices in a pair of wearable audio devices, may include a pressure sensor or deformation sensor, for example, in a flexible flap forming an eartip 106 of the wearable audio device. Eartip 106 in FIGS. 3a, 3b, and 3c may correspond to sealing structure/eartip 34 of FIG. 2d and may include an aperture, similar to aperture 118 illustrated in FIGS. 1a and 1b or output aperture 52 of FIG. 2d, at a distal end 104 thereof. Body portion 102 may correspond to the concha portion 120 of FIGS. 1a and 1b. The retention element or outer leg structure 103 may correspond to the extensions 122 of FIGS. 1a and 1b or the outer leg 30 of FIG. 2d.

The pressure or deformation sensor may include one or more sections of an electrically active material 108 disposed on an internal surface or within the material of the eartip 106. The electrically active material 108 may be a thin film of material, for example, having a thickness of 0.028 mm or less, 0.020 mm or less, or 0.018 mm or less. The electrically active material 108 may be disposed on a surface (for example, an internal surface) of the eartip 106 and in some examples, may be covered and/or sealed by another film layer, for example, a film of the same or a different material than that of the eartip 106.

The electrically active material 108 may be a material that exhibits one or more electrical properties that change responsive to pressure or deformation of the electrically active material 108. The electrically active material 108 may be an electrically active polymer. The electrically active material 108 may include or consist of a piezoelectric material or piezoelectric polymer. Non-limiting examples of piezoelectric polymers that may be utilized as or in the electrically active material 108 include polyvinylidenefluoride (PVDF), polyvinylidenefluoride copolymers with trifluoroethylene (TrFE) and/or tetraflouoroethylene (TFE), polyurea, polyamide (e.g., Nylon-5 or Nylon-11), or other semi-crystalline piezoelectric polymers, liquid-crystalline piezoelectric polymers, piezoelectric biopolymers (e.g., collagen, polypeptides like poly-methylglutamate and poly-benzyl-L-glutamate, oriented films of DNA, poly-lactic acid, and chitin), or amorphous piezoelectric polymers (e.g., polyacrylonitrile (PAN), poly(vinylidenecyanide vinylacetate) (PVDCN/VAc), polyphenylethernitrile (PPEN), poly (1-bicyclobutanecarbonitrile), polyvinyl chloride (PVC), and polyvinyl acetate (PVAc)).

In other implementations, the electrically active material 108 may include or consist of a material that exhibits a change in electrical resistivity responsive to pressure or deformation. The electrically active material 108 may include of consist of, for example, conductive fillers such as graphene or carbon black in a silicone or polysilicone matrix. The matrix material may include or consist of, for example, a material that is substantially similar to the novelty material Silly Putty, available from Crayola. This material may be referred to as "G-putty". (See C. Boland et al., (2016). Sensitive electromechanical sensors using viscoelastic graphene-polymer nanocomposites. *Science,* 354 (6317), 1257-1260, incorporated herein by reference in its entirety.) In other examples, the matrix material may include or consist of hydroxy terminated oil and boric acid in addition to graphene or carbon black. In some examples, the graphene or carbon black may be present in the silicone or polysilicone matrix in amounts ranging between 0 volume % to 16 volume %, and in other examples, the graphene or carbon black may be present in amounts ranging between 5 weight % to 16 weight %. Electrically active material including 15 volume % graphene in a silicone matrix may exhibit a conductivity of about 0.1 S/m, or in some examples may exhibit a conductivity of about 0.03 S/m.

In some examples, the electrically active material 108 may be broken into several separate portions to measure pressure or deformation of different areas of the eartip 106. As illustrated in FIG. 3a, the electrically active material 108 may be provided as a plurality of disconnected film segments that are disposed about the circumference of the eartip 106. In some examples, there may be from 2 to 6 or more different film segments of the electrically active material 108. Electrical properties (or changes thereof) of the different film segments may be monitored and/or compared to determine a type and/or degree of pressure or deformation applied to or exhibited by different portions of the eartip 106. The degree of pressure or deformation applied to or exhibited by different portions of the eartip 106 may be indicative of a type of gesture being performed by a user wearing the wearable audio device 101. It is to be understood that the shape of the film segments illustrated in FIG. 3a is not intended to be limiting. The film segments, may, for example, be thinner or in the form of strips extending from proximate the base to proximate the tip 104 of the eartip 106.

In another example, illustrated in FIG. 3b, the electrically active material 108 may be in the form of one or a plurality of rings that at least partially or completely encircle the eartip 106 at different distances between the base and tip of the eartip. The electrical properties (or changes thereof) in different of the rings may provide a signature indicative of a type of gesture being performed by a user wearing the wearable audio device 101.

In another example, illustrated in FIG. 3c, the electrically active material 108 may be in the form of a single film that may be disposed over or within the majority of the area of the flexible flap portion of the eartip 106. Different electrical contacts 108a may be provided to measure electrical properties of or across different areas of the film of electrically active material 108. Different of the electrical contacts 108a may be disposed at different locations and/or on different sides (for example, front and back) of the electrically active material 108. Comparison of readings of electrical properties at the different electrical contacts 108a may provide a signature indicative of a type of gesture being performed by a user wearing the wearable audio device 101.

It is to be understood that electrical contacts 108a as illustrated in FIG. 3c may also be present in contact with the electrically active material 108 in the examples of FIGS. 3a and 3b. These and other electrical connections and circuit elements are omitted for the sake of clarity. In some examples, wearable audio devices as disclosed herein may include at least a portion of the electrical circuitry disclosed in commonly owned U.S. Pat. No. 10,257,602 "EARBUD INSERTION SENSING METHOD WITH INFRARED TECHNOLOGY", which is incorporated herein by reference in its entirety.

Figure 4:
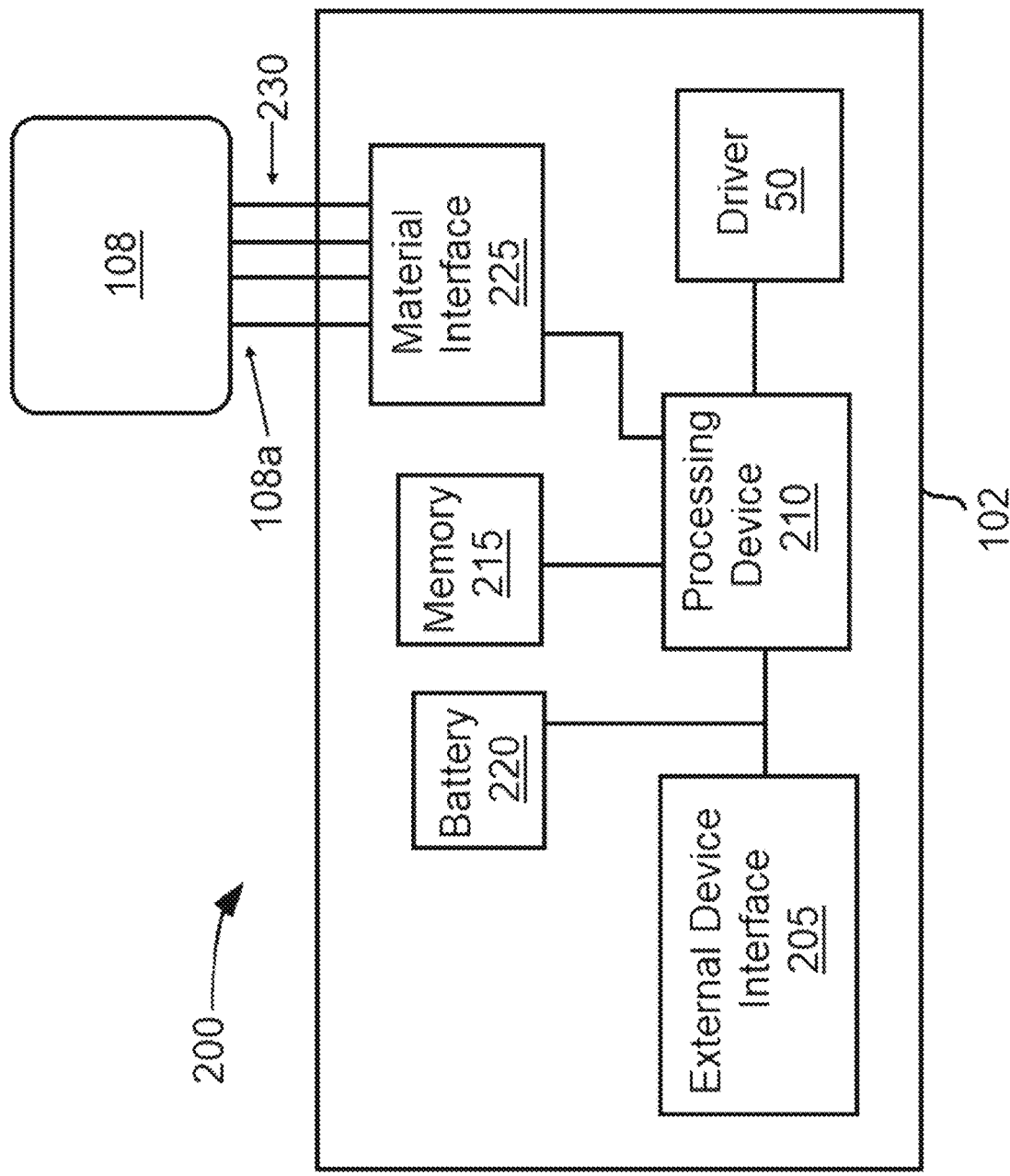
FIG. 4 is a block diagram of circuit elements that may be included in examples of wearable audio devices disclosed herein.
Figure 5:
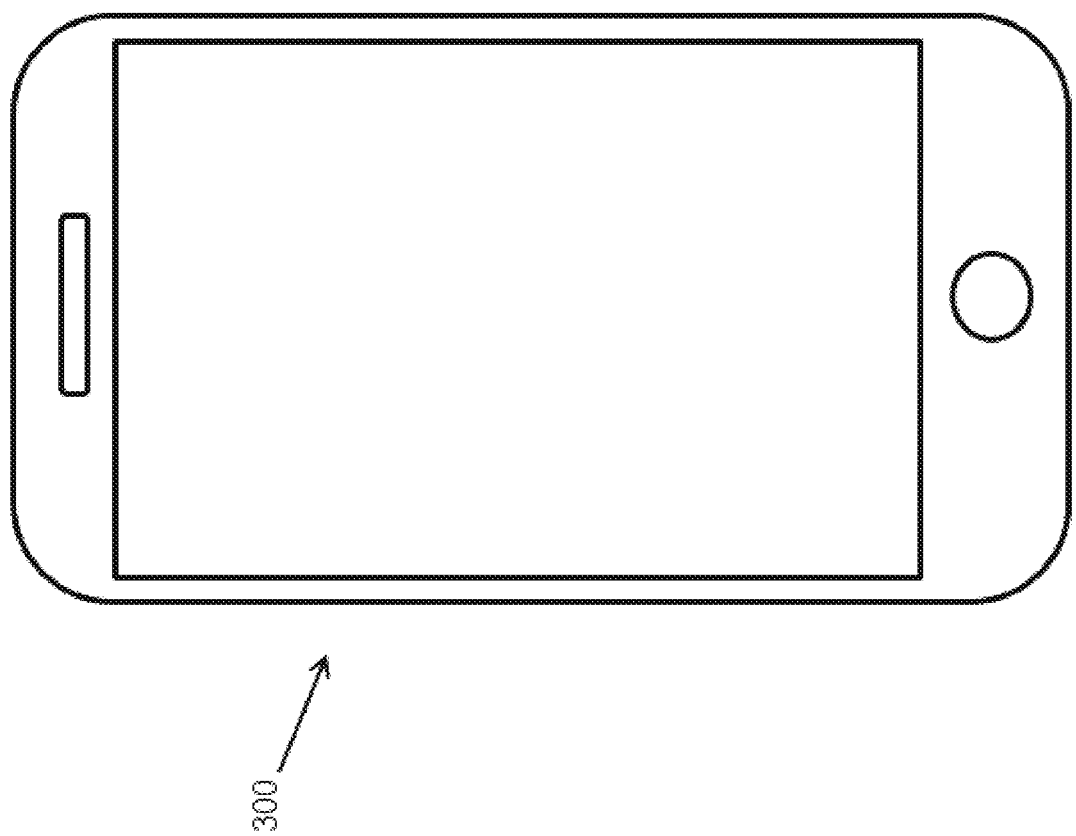
FIG. 5 illustrates an example of an external electronic device that may include functions controlled by signals generated by the electrically active film in examples of wearable devices disclosed herein.

FIG. 4 is a block diagram of circuit elements, collectively indicated at 200, that may be included in the wearable audio devices described herein, for example, within a body portion 102 of a wearable audio device as disclosed herein. Circuit elements 200 may include an interface 205 for communication with an external electronic device, for example, a music player or mobile telephone, for example, a smartphone 300 as illustrated in FIG. 5. The interface 205 may enable communication between the circuitry of the wearable audio device 101 and an external electronic device via wired or wireless communication, for example, in accordance with the Bluetooth® wireless technology standard or other wireless communication standards known in the art. The interface 205 may be in communication with a processing device 210 which may, for example, perform signal processing on data communicated through the interface 205 from an external electronic device and which may output an audio signal to an audio driver 50. The processing device may be a general-purpose microprocessor or microcontroller, for example, one of the microprocessors or microcontrollers available from Intel®, an application specific integrated circuit (ASIC), or other processing device known in the art. The processing device 210, or a separate processing device, may process signals received from the electrically active material 108 in the eartip 106 to determine a gesture that is being performed by a wearer of the wearable audio device 101. A memory 215, which may include control instructions, calibration information, or other data may be in communication with the processing device 210. In some implementations, for example, for wireless forms of the wearable audio device 101, a battery 220 may be provided to power the circuitry 200 of the wearable audio device 101.

The circuit elements 200 may also include an interface 225 for communication with the electrically active material 108 in the eartip 106. The interface 225 may be electrically coupled to wires or other conductive elements 230 which provide electrical communication between the interface 225 and electrical contacts 108a of the electrically active material 108. The number of conductive elements 230 may be selected based on a number of different portions of electrically active material 108 in the eartip 106 and/or a number of different electrical contacts 108a of the electrically active material 108. The interface 225 may perform signal processing of readings from the electrically active material 108 and communicate information regarding same to the processing device 210 or may convey raw unprocessed signals from the electrically active material 108 to the processing device 210.

It is to be understood that circuit elements 200 may be formed integral with one another on a single microchip or circuit board or may be separate elements, or may be at least partially implemented in software, rather than as hardware elements. Further, any one or more of the circuit elements 200 illustrated in FIG. 4 may alternatively be implemented in hardware or software in an electronic device, for example, a music player or mobile telephone in communication with the wearable audio device 101. The illustrated circuit elements 200 may represent only a subset of circuit elements 200 present in different examples of a wearable audio device 101 as disclosed herein. Not all of the illustrated circuit elements 200 may be included in each example of a wearable audio device 101 as disclosed herein. The circuit elements 200 may be connected in arrangements other than as depicted in FIG. 4.

The eartip 106 of the wearable audio device 101 and the electrically active material 108 may deform in predictable and/or repeatable ways when a user wearing the eartip make different gestures or facial movements or expressions, collectively referred to herein as "facial movements". A non-limiting list of different facial movements that may be detected by the circuitry of the eartip due to deformation of or pressure applied to the electrically active material 108 includes, a smile, a frown, a wink, an eyebrow raise, a clenching of the jaw, movement of the jaw forward, backward, or to one or another side, raising of the ears, a head turn, an opening of the mouth, a flaring of the nostrils, movement of one or both cheeks, etc. Other motions or actions, for example, touching the wearable audio device with a finger or pulling on an earlobe or other portion of the ear of the user, may also cause deformation of or pressure to be applied to the electrically active material 108 and should be considered included in movements referred to generally herein as facial movements.

Figure 6:
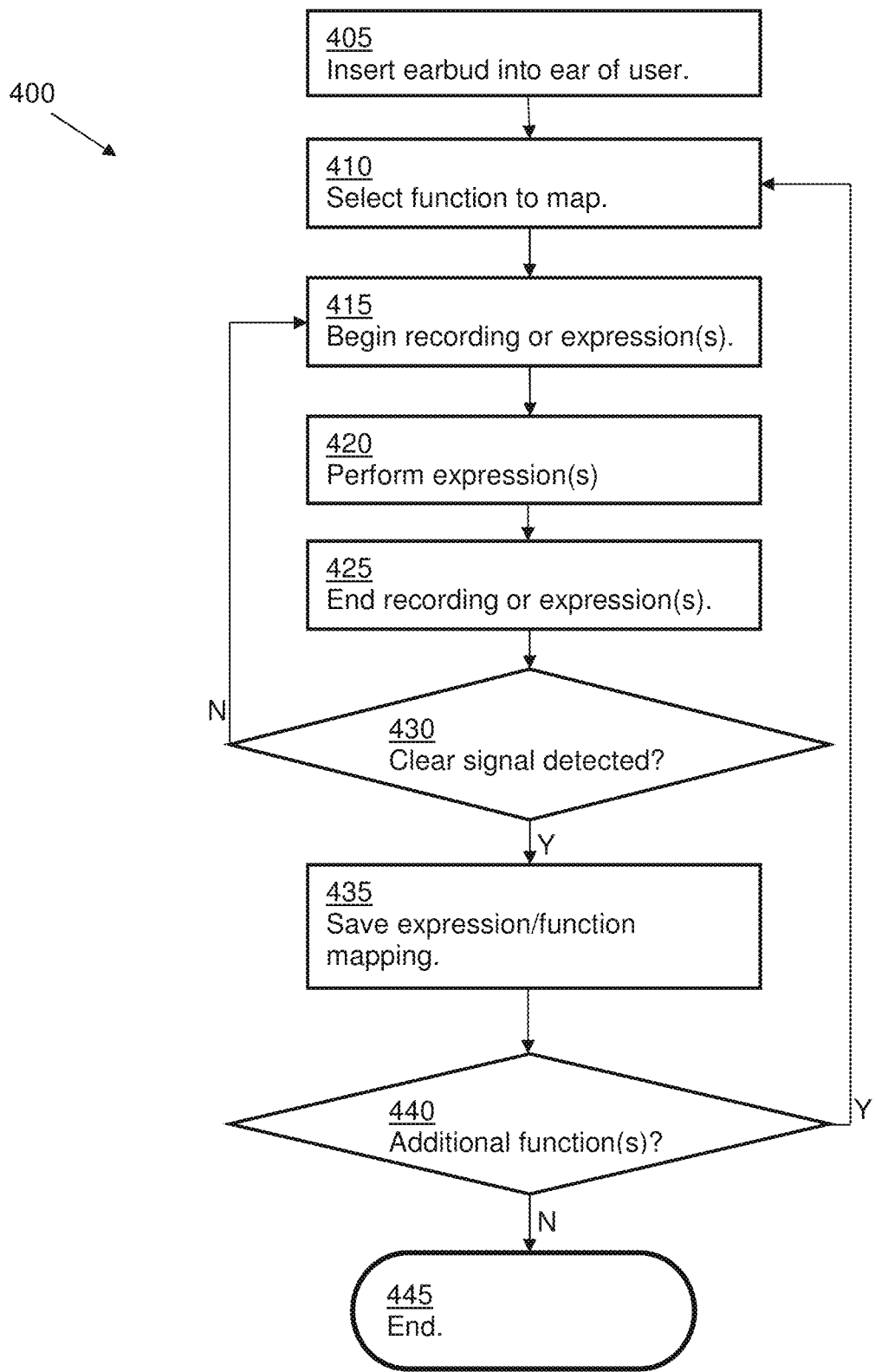
FIG. 6 is a flow chart of a method of training a wearable device including electrically active film to associate movements of a user that cause signals to be generated by the electrically active film with control functions of an electronic device.

Signals generated by deformation of the electrically active material 108 associated with any one or more of these facial movements, or in some examples, a pattern of one or more of these facial movements (for example, a jaw clench followed by a wink) may be associated, in memory 215 of the wearable audio device 101 or in an external electronic device in communication with the wearable audio device 101, with functions of the external electronic device. A non-limiting list of functions of an external electronic device which may be performed or activated responsive to the wearable audio device 101 detecting a particular facial movement, or pattern thereof, include start or stop rendering of audio, skip an audio track, raise or lower volume of rendered audio, initiate or terminate a phone call, activate or deactivate active noise reduction, select a level of active noise reduction, invoke a virtual personal assistant (for example, mimicking vocalization of a wake word for a virtual personal assistant), navigate or select items in a list presented via augmented reality or otherwise on an external electronic device, or any other function of an external electronic device. In some implementations, a wearable audio device or software running on an external electronic device may be pre-programmed to associate different facial movements with different functions of the external electronic device. In other examples, a wearable audio device and/or external electronic device may be programmed by a user to perform a specific function in response to detecting a particular facial movement or pattern of different (or repetitions of the same) facial movements. One method of performing such training is illustrated in the flow chart 400 of FIG. 6. This method assumes that one has performed whatever operations are necessary to allow the wearable audio device to communicate with the external electronic device and that a program or application for performing the training has been installed on the external electronic device or another device in communication with the external electronic device and/or wearable audio device.

In act 405 of the training method a user inserts a wearable audio device including electrically active material 108 into, on, or near an ear of the user and couples the wearable audio device to an external electronic device, for example, a smartphone. In act 410, the user selects a function of the external electronic device that the user would like to activate via one or more facial movements. The user may select the function through, for example, a drop-down menu on the external electronic device. The user may optionally also indicate whether the user would like to map a single type of facial movement to the function or if the user would like to map a pattern of repeated or different facial movements to the function. In act 415, optionally after selecting a "begin" or other such indicator on the external electronic device, the user performs a desired facial movement or pattern of facial movements. After performing the desired facial movement or pattern of facial movements the user selects a "stop" or other such indicator on the external electronic device to end recording of the facial movement(s) (act 425). Acts 415-425 may be repeated several times to provide the wearable audio device and/or external electronic device several samples of the signal(s) generated by the electrically active material 108 responsive to the user performing the desired facial movement or pattern of facial movements. The wearable audio device and/or external electronic device may combine or otherwise analyze the several samples to determine a typical pattern and typical variations in the pattern that the wearable audio device and/or external electronic device may utilize to recognize the facial movement or pattern of facial movements performed by the user.

In act 430, the wearable audio device and/or external electronic device may analyze the recorded signal(s) to determine if the recorded signal(s) are sufficiently clear or exhibit a signal to noise ratio that indicates that the recoded signal(s) may be reliably associated with the performed facial movement(s). If the signal is not clear enough or has too low a signal to noise ratio, the user may be prompted to try recording the facial movement(s) again or to select alternate facial movement(s) to try and associate with the function of the external electronic device. If the wearable audio device and/or external electronic device determines that the signal(s) associated with the performed facial movement(s) is/are sufficiently clear or have a sufficiently high signal to noise ratio for reliable detection, the mapping between the function of the external electronic device and the performed facial movement or pattern of facial movements may be recorded in memory of the wearable audio device and/or external electronic device, optionally after confirmation to do so received by the user, for example, through the interface of the external electronic device (act 435).

In act 440 the user indicates to the external electronic device and/or wearable audio device if there are additional functions of the external electronic device that the user would like to activate via one or more facial movements or expressions. If so, the method returns to act 410. If not, the method ends at act 445.

Although discussed above with respect to wearable audio devices, it is to be appreciated that electrically active material 108 as disclosed herein may be disposed on or within other forms of wearable items and signals from same may be monitored as disclosed herein to control one or more functions of an electronic device responsive to movements of a user detected from deformation of or pressure applied to the electrically active material 108.

Figure 7A:
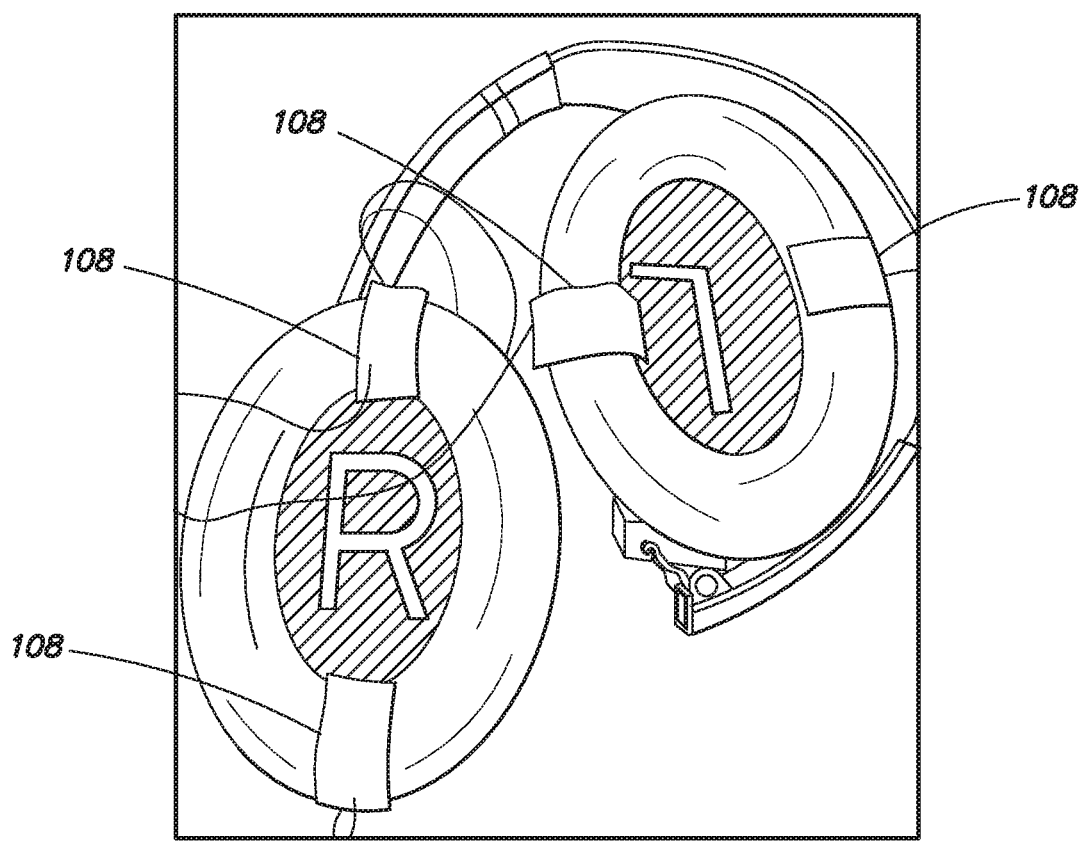
FIG. 7a illustrates a pair of headphones including electrically active film disposed on the earcushions.
Figure 7B:
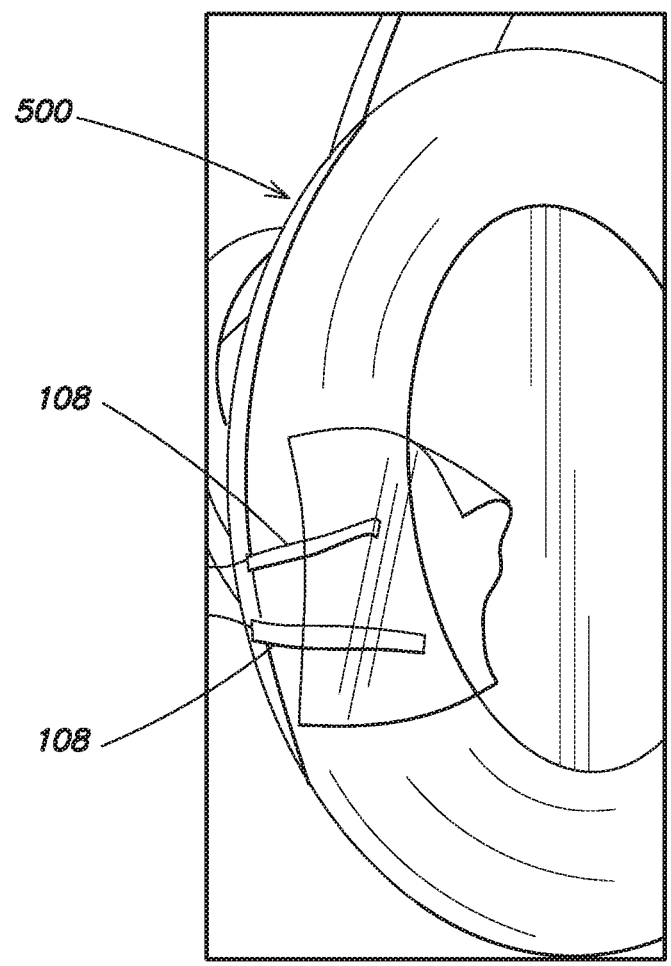
FIG. 7b illustrates a pair of headphones including another example of an electrically active film disposed on the earcushions.
Figure 7C:
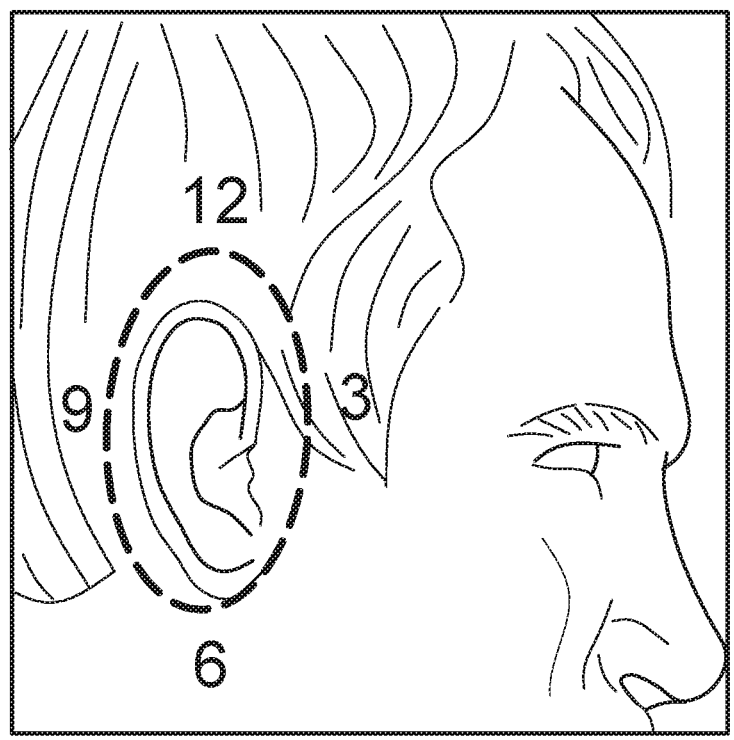
FIG. 7c illustrates examples of locations for electrically active film disposed on headphone earcushions about an ear of a user.

In one example, one or more portions of electrically active material 108 as disclosed herein may be affixed to or disposed within an earcushion of a supra-aural or circum-aural headphone. One example of this is illustrated in FIG. 7A. Another Example is illustrated in FIG. 7B. One or more expressions or movements of the muscles of a user's face may induce a signal in the electrically active material 108 on or in headphones 500 as illustrated in FIG. 7A or 7B and may be read by circuitry within the headphones or an external electronic device in communication with the headphones to control one or more functions of the external electronic device or the headphones. The electrically active material 108 may be disposed on one or more locations on the earcushion to contact the head of the user at one or more locations at, for example, 3:00, 6:00, 9:00, and/or 12:00 about the ear of the user as illustrated in FIG. 7C.

Figure 8:
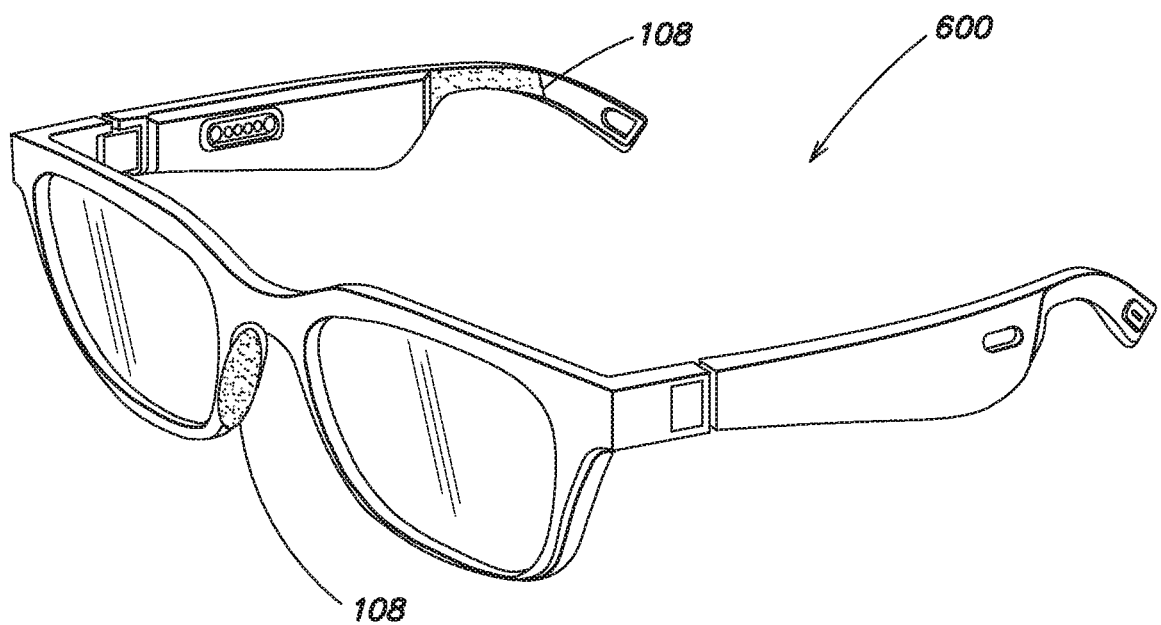
FIG. 8 illustrates a pair of eyeglasses including electrically active film disposed on different portion of the frames.
Figure 11:
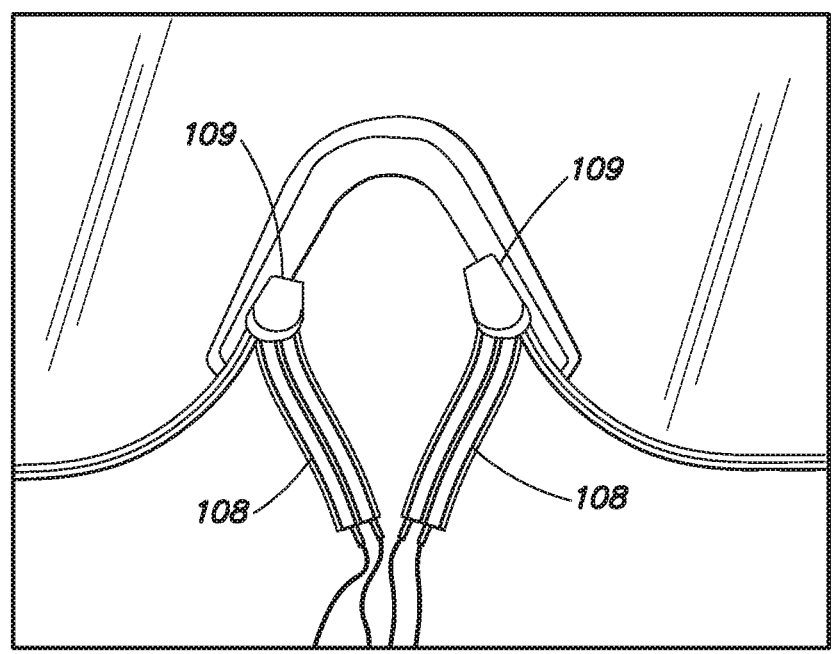
FIG. 11 illustrates an example of a configuration of a piezoelectric wire or force sensing resistor coupled to a portion of an eyeglass frame.

In another example, electrically active material 108 may be disposed on selected areas of a pair of eyeglasses 600, for example, as illustrated in FIG. 8. The electrically active material 108 may be disposed on surfaces of the eyeglass frame on the nose bridge portion of the eyeglass frame or on portions of the legs of the eyeglass fame above or proximate where the eyeglass frame would contact the head of a user proximate the ears of the user as illustrated in FIG. 8. One or more expressions or movements of the head of the user or of the muscles of a user's face may induce a signal in the electrically active material 108 on the eyeglass frame as illustrated in FIG. 8 and may be read by circuitry within the eyeglass fame or an external electronic device in communication with the eyeglass frame to control one or more functions of the external electronic device, for example, to manipulate or select menu items in an augmented reality image projected on to one or more lenses of the eyeglasses 600. In some examples where an electrically active material 108 is disposed on the nose bridge portion of an eyeglass frame as illustrated in FIG. 8, the electrically active material 108 may comprise a wire made of piezoelectric material or force sensing resistor. An example configuration of the piezoelectric wire or force sensing resistor is illustrated in FIG. 11. The wire or force sensing resistor exhibit a decrease in resistance with increase in force applied to the surface of the sensor, are easy to manufacture, and are well-suited to enable detection of signals generated by deformation of the electrically active material 108 associated with longer, sustained facial movements, such as a sustained eyebrow raise. As illustrated in FIG. 11, the electrically active material 108 may be attached to a skin interfacing component 109. The skin interfacing component may include or consist of silicone.

Wearable items including electrically active material 108 that may provide a signal responsive to deformation or pressure may be utilized in implementations other than controlling functions of an electronic device. For example, electrically active material 108 disposed within or on a wearable audio device or eyeglass frame as disclosed herein may be utilized to provide a signal indicative of a pulse of a user wearing the wearable audio device. The pulse signal may be output to a fitness tracker or exercise monitor or a form of medical monitor, for example, implemented in a smartphone as illustrated in FIG. 5 or otherwise, to provide an indication of the pulse of the user during exercise or during another period in which it is desirable to monitor the pulse of the user. In another example, electrically active material 108 disposed within or on an eyeglass frame as disclosed herein may be utilized to provide a signal indicative of facial movement Example 1

Figure 9:
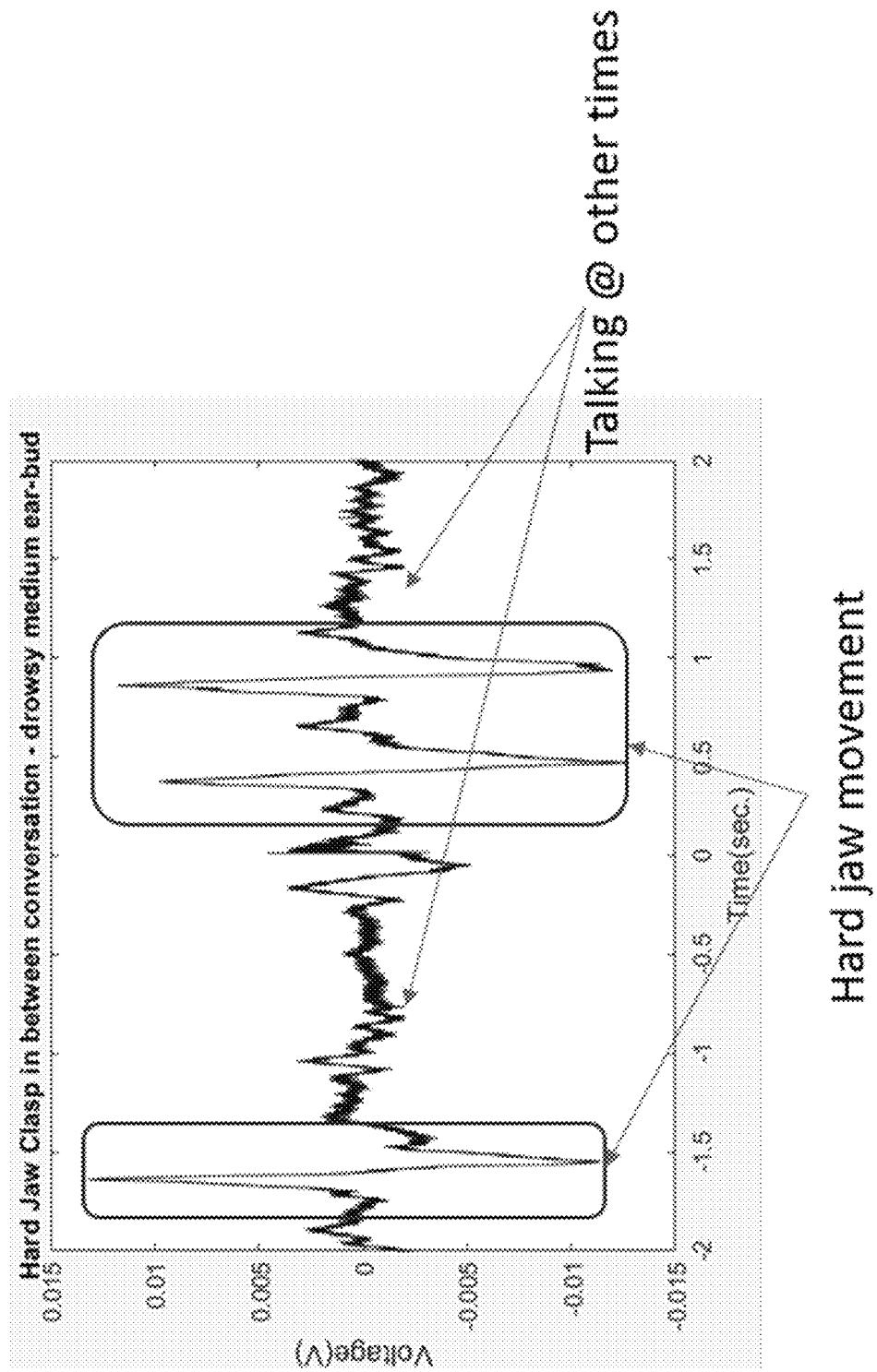
FIG. 9 illustrates signals generated by electrically active film disposed in a wearable audio device responsive to clamping of the jaw of a user wearing the wearable audio devices.

In one example, a single piece of PVDF film was coupled to the inside surface of the eartip of a wearable audio device similar to that illustrated in FIG. 3a. A user inserted the wearable audio device into one of the ears of the user. The user was instructed to periodically clamp his or her jaw shut in between periods of talking. Voltage across the PVDF film was monitored while the user was performing these actions. A chart of voltage across the PVDF film, illustrated in FIG. 9, illustrated clear spikes when the user clamped his or her jaw shut. A system as disclosed herein could detect these voltage spikes and use them as control signals for activating a function of an external electronic device.

Example 2

Figure 10:
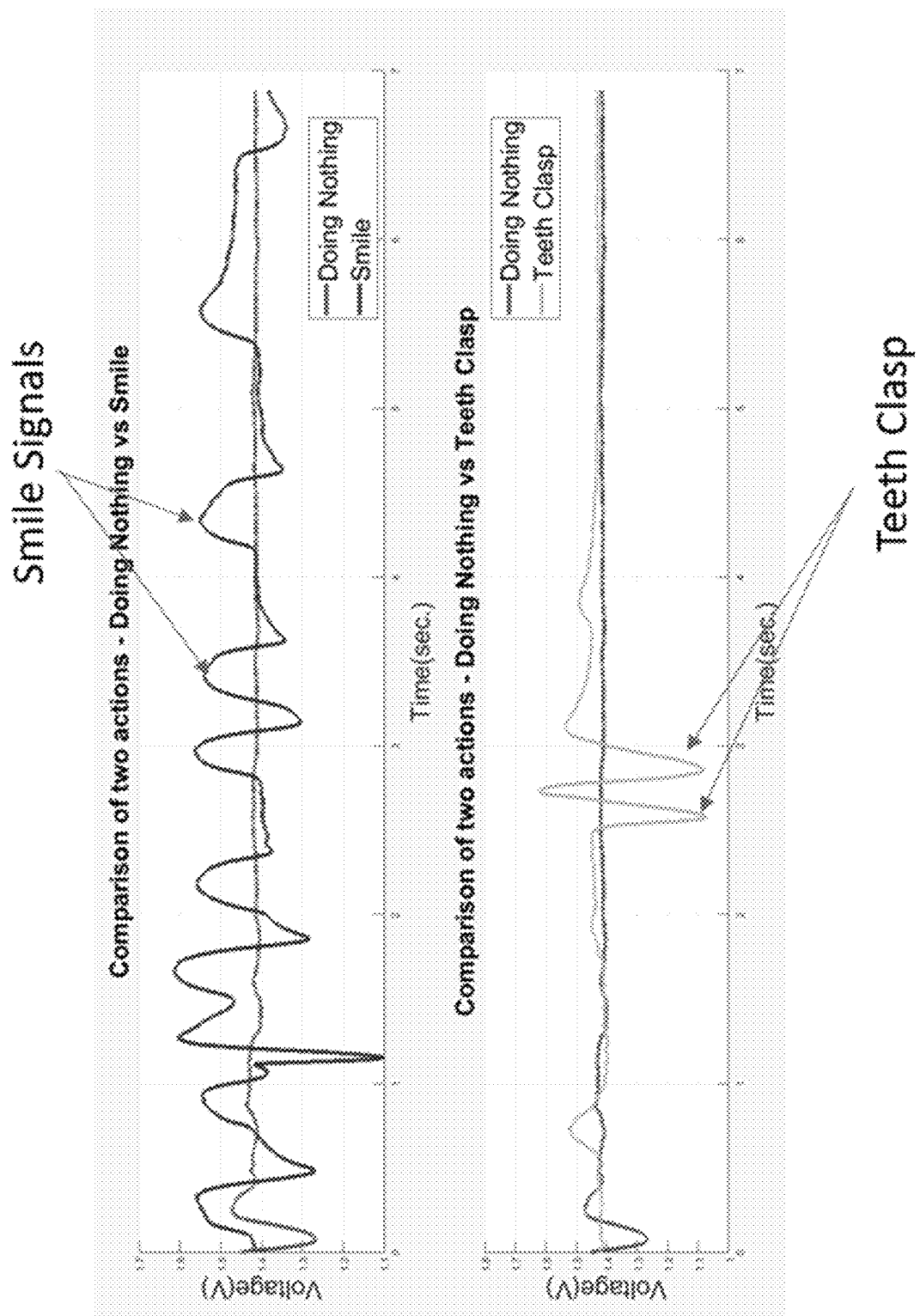
FIG. 10 illustrates signals generated by electrically active film disposed on earcushions of headphones generated by actions taken by a user wearing the headphones.

In another example, two pieces of PVDF film were affixed to the surfaces of earcushions of a pair of earphones similar to those illustrated in FIG. 7. A user was asked to wear the headphones and to periodically smile during a first test, and to periodically clasp his or her teeth in a second test. A measurement of voltage across the PVDF films when performing these actions showed clear voltage spikes associated with these movements, as illustrated in FIG. 10. A system as disclosed herein could detect these voltage spikes and use them as control signals for activating a function of an external electronic device.

Example 3

Figure 12:
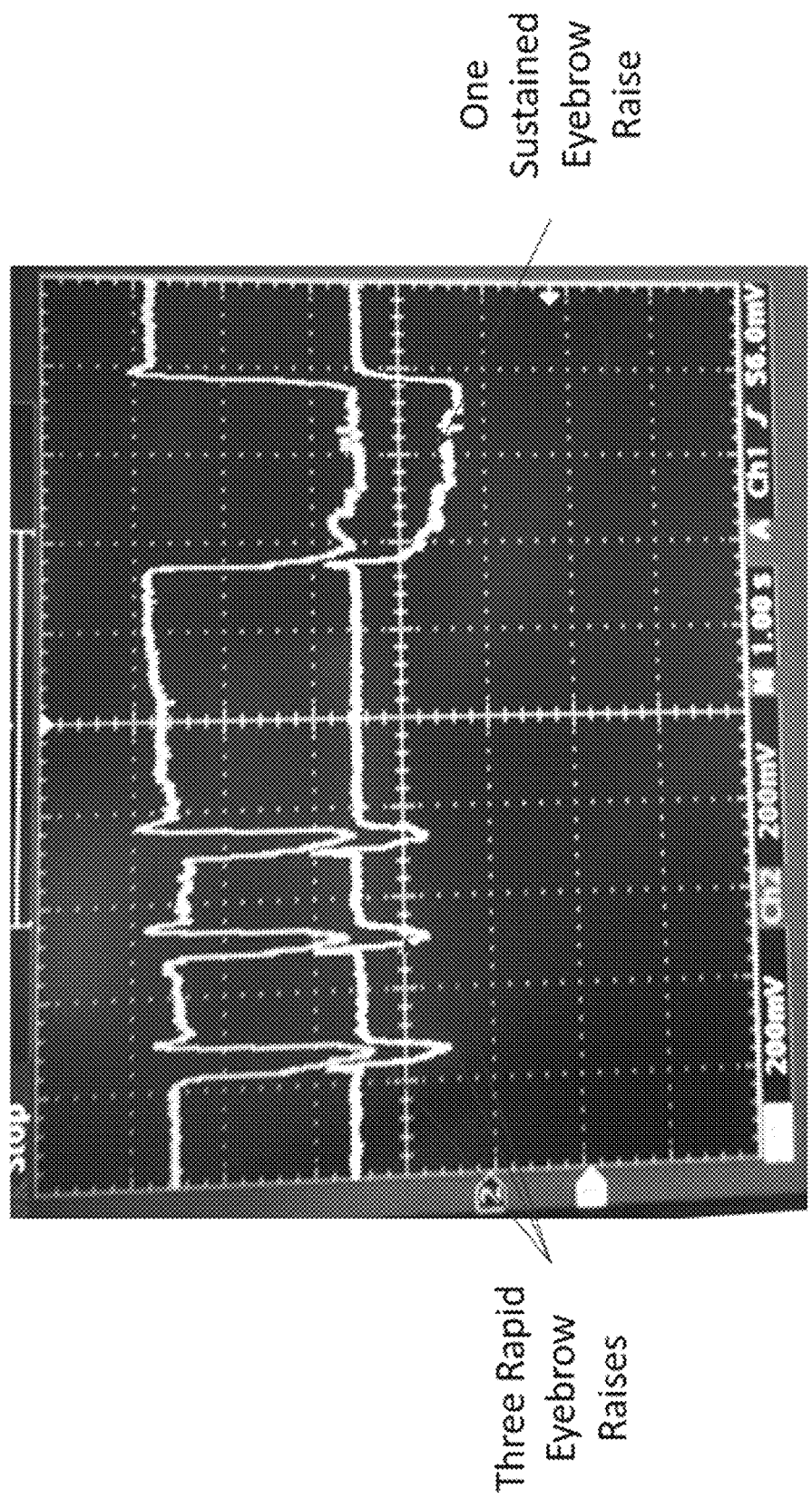
FIG. 12 illustrates electrical response of force sensing resistors coupled to an eyeglass frame as illustrated in FIG. 11 when a user wearing the eyeglass frame raised and lowered their eyebrows.

In another example, two force sensing resistors were affixed to the surfaces of an eyeglass frame and to a soft silicone components for interfacing with the skin, as illustrated in FIG. 11. A user wore the eyeglasses and was asked to first rapidly raise the user's eyebrows, and then again raise the user's eyebrows but to hold the eyebrow up for a brief period of time before lowering the eyebrows. A measurement of voltage across the force sensing resistors when performing these actions showed voltage spikes associated with the rapid movements as well as a consistent voltage change associated with the singular movement, as illustrated in FIG. 12. A system as disclosed herein could detect these voltage spikes and use them as control signals for activating a function of an external electronic device.

Having thus described several aspects of at least one implementation, it is to be appreciated various alterations, modifications, and improvements will readily occur to those skilled in the art. Such alterations, modifications, and improvements are intended to be part of this disclosure, and are intended to be within the spirit and scope of the disclosure. The acts of methods disclosed herein may be performed in alternate orders than illustrated, and one or more acts may be omitted, substituted, or added. One or more features of any one example disclosed herein may be combined with or substituted for one or more features of any other example disclosed. Accordingly, the foregoing description and drawings are by way of example only.

The phraseology and terminology used herein is for the purpose of description and should not be regarded as limiting. As used herein, the term "plurality" refers to two or more items or components. As used herein, dimensions which are described as being "substantially similar" should be considered to be within about 25% of one another. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system comprising:
    a wearable item comprising a film of an electrically active material configured to exhibit one or more electrical properties that vary responsive to a movement or gesture performed by a user wearing the wearable item; and
    a controller configured to read the one or more electrical properties of the electrically active material and to activate a control function of an electronic device external to the wearable item responsive to detecting a predetermined pattern exhibited by the one or more electrical properties of the electrically active material, the control function selected from the group consisting of starting rendering of an audio track, stopping rendering of the audio track, skipping the audio track, raising a volume of rendered audio, lowering the volume of the rendered audio, initiating a phone call, terminating the phone call, activating active noise reduction, deactivating active noise reduction, selecting a level of active noise reduction, invoking a virtual personal assistant, navigating items in a list presented via augmented reality, or selecting an item in the list presented via augmented reality.

2. The system of claim 1, wherein the wearable item is at least one of: an earbud, a headphone, an open-ear audio device, or audio eyeglasses.

3. The system of claim 2, wherein the film of electrically active material is disposed in an eartip of the earbud.

4. The system of claim 3, wherein deformation or pressure applied to the eartip responsive to a facial movement of the user causes the one or more electrical properties of the electrically active material to change.

5. The system of claim 4, wherein the controller is configured to discriminate between patterns of change in the one or more electrical properties of the electrically active material associated with different facial movements of the user.

6. The system of claim 5, wherein the controller is configured to associate different control functions of the electronic device with the different facial movements of the user and to active the different control functions responsive to detection of the different respective facial movements of the user.

7. The system of claim 1, wherein the electrically active material is a piezoelectric material.

8. The system of claim 7, wherein the electrically active material is a piezoelectric polymer.

9. The system of claim 1, wherein the electrically active material is a material having an electrical resistance that changes responsive to deformation of the material.

10. The system of claim 9, wherein the electrically active material includes carbon particles in a silicone matrix.

11. The system of claim 1, wherein the controller is further configured to perform a training routine in which the movement or gesture performed by the user is mapped to the control function of the electronic device.

12. The system of claim 1, wherein the electronic device includes a pulse monitor and activating the control function of the electronic device further includes recording a pulse of the user determined from the pattern exhibited by the one or more electrical properties of the electrically active material.

13. The system of claim 1, wherein the movement is a facial movement selected from the group consisting of a smile, a frown, a wink, an eyebrow raise, raising of the ears, a head turn, an opening of the mouth, a flaring of the nostrils, movement of one or both cheeks, or pulling on an earlobe or other portion of the ear of the user.

14. A method of controlling one or more functions of an electronic device, the method comprising:
    applying a wearable item to the body of a user, the wearable item comprising a film of an electrically active material configured to exhibit one or more electrical properties that vary responsive to a movement or gesture performed by the user;
    monitoring the one or more electrical properties of the electrically active material; detecting a change in the one or more electrical properties of the electrically active material; and
    activating a control function of an electronic device external to the wearable item responsive to detecting a predetermined pattern in the change in the one or more electrical properties of the electrically active material, the control function selected from the group consisting of starting rendering of an audio track, stopping rendering of the audio track, skipping the audio track, raising a volume of rendered audio, lowering the volume of the rendered audio, initiating a phone call, terminating the phone call, activating active noise reduction, deactivating active noise reduction, selecting a level of active noise reduction, invoking a virtual personal assistant, navigating items in a list presented via augmented reality, or selecting an item in the list presented via augmented reality.

15. The method of claim 14, wherein applying the wearable item to the body of the user includes inserting an earbud into an ear of the user.

16. The method of claim 14, further comprising activating one control function of the electronic device responsive to detecting a change in the one or more electrical properties of the electrically active material associated with a first type of movement of the user and activating a second control function of the electronic device responsive to detecting a change in the one or more electrical properties of the electrically active material associated with a second type of movement of the user.

17. The method of claim 16, wherein one of the first type of movement or the second type of movement is a facial movement.

18. The method of claim 14, wherein activating the control function of the electronic device further includes recording a pulse of the user determined from the pattern in the change in the one or more electrical properties of the electrically active material.

19. The method of claim 14, wherein the wearable item includes a pair of eyeglasses.

20. The method of claim 14, wherein the electrically active material comprises a force sensing resistor.

21. The method of claim 20, wherein the movement is a facial movement.

\* \* \* \* \*